(12) United States Patent
Subramanian et al.

(10) Patent No.: US 12,361,110 B1
(45) Date of Patent: Jul. 15, 2025

(54) CERTIFICATE CHAOS TEST MODE

(71) Applicant: Amazon Technologies, Inc., Seattle, WA (US)

(72) Inventors: Manikandan Subramanian, Seattle, WA (US); Michael S. Slaughter, Avondale Estates, GA (US)

(73) Assignee: Amazon Technologies, Inc., Seattle, WA (US)

( * ) Notice: Subject to any disclaimer, the term of this patent is extended or adjusted under 35 U.S.C. 154(b) by 256 days.

(21) Appl. No.: 17/850,552

(22) Filed: Jun. 27, 2022

(51) Int. Cl.
*H04L 9/08* (2006.01)
*G06F 21/33* (2013.01)
*H04L 9/32* (2006.01)

(52) U.S. Cl.
CPC .................. *G06F 21/33* (2013.01)

(58) Field of Classification Search
CPC ........... G06F 21/30; G06F 21/31; G06F 21/33
USPC ............................... 726/17–19, 21
See application file for complete search history.

(56) References Cited

U.S. PATENT DOCUMENTS

| | | | | |
|---|---|---|---|---|
| 8,856,514 B2* | 10/2014 | Dixon | ................. | H04L 9/3265 713/157 |
| 9,401,911 B2* | 7/2016 | Castelnuovo | ....... | H04L 63/0823 |
| 9,712,418 B2* | 7/2017 | Cornell | ................. | G06Q 10/10 |
| 10,936,459 B2* | 3/2021 | Chen | ....................... | G06F 21/74 |
| 11,336,675 B2* | 5/2022 | Sbandi | ................ | H04L 63/1433 |
| 11,483,165 B2* | 10/2022 | Yang | ....................... | H04L 9/3265 |
| 12,132,722 B1* | 10/2024 | Cignetti | ................ | H04L 63/108 |
| 12,137,175 B1* | 11/2024 | Sharma | ................ | H04L 9/3268 |
| 2004/0193872 A1* | 9/2004 | Saarepera | .............. | G06F 21/64 713/156 |
| 2005/0071630 A1* | 3/2005 | Thornton | ............ | H04L 63/0823 713/156 |
| 2018/0034646 A1* | 2/2018 | Kuramoto | ............. | H04L 9/3268 |
| 2020/0358757 A1* | 11/2020 | Kulkarni | ................ | H04L 63/06 |
| 2022/0078033 A1* | 3/2022 | Bysani Venkata Naga | ................. | G06F 21/604 |
| 2022/0138765 A1* | 5/2022 | Patterson | ................ | H04L 63/20 705/317 |
| 2023/0269137 A1* | 8/2023 | Fehring | ............... | H04L 67/1097 709/220 |
| 2024/0119133 A1* | 4/2024 | Mohan | .................... | G06F 21/33 |

* cited by examiner

*Primary Examiner* — Bharat Barot
(74) *Attorney, Agent, or Firm* — BakerHostetler

(57) ABSTRACT

A certificate renewal service may receive an indication to request renewal of a certificate in a test mode that allows testing of certificate characteristic property change effects. The certificate renewal service may select, based on the renewal of the certificate being requested in the test mode, a renewal time for renewing of the certificate. The certificate renewal service may change, based on the renewal of the certificate being requested in the test mode, one or more properties of one or more certificate characteristics of the certificate in a certificate renewal request. The certificate renewal service may request renewal of the certificate based on the renewal time with one or more changes to the one or more properties of the one or more certificate characteristics.

15 Claims, 8 Drawing Sheets

610 Receive, by a certificate renewal service, an indication to request renewal of a certificate in a test mode that allows testing of certificate characteristic property change effects

612 Select, by the certificate renewal service, based on the renewal of the certificate being requested in the test mode, a renewal time for the renewal of the certificate, wherein the renewal time is a randomly determined time prior to expiration of the certificate

614 Change, by the certificate renewal service, based on the renewal of the certificate being requested in the test mode, one or more properties of one or more certificate characteristics of the certificate in a certificate renewal request

616 Request, by the certificate renewal service, based on the renewal time, the renewal of the certificate with one or more changes to the one or more properties of the one or more certificate characteristics

618 Sign a certificate renewal request (e.g., a signing request) to result in a renewed certificate

FIG. 6

CERTIFICATE CHAOS TEST MODE

BACKGROUND

Certificates are a widely employed security feature and are used by different parties in a wide variety of contexts. Certificates may have various characteristics, such as key algorithm type, validity duration, key size, key usage, domain name, alternate domain name(s), and others. When a certificate is issued, it may be issued from a certificate authority and there may be one or more intermediate issuing certificate authorities between the end certificate and the root. In some examples, certificates may be attached to service endpoints and may be used when clients call the endpoint. To avoid expiration, a certificate may be renewed prior to the end of its validity duration period, which may be a characteristic of the certificate. A certificate renewal process may include generating and issuing signing requests for renewed certificates and signing of the signing requests. Generating and issuing of the signing requests may be performed by a certificate renewal service. Signing of the signing requests may be performed by a certificate authority.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 6 is a flowchart illustrating an example chaos mode certificate testing process that may be used in accordance with the present description.

DETAILED DESCRIPTION

Figure 1:
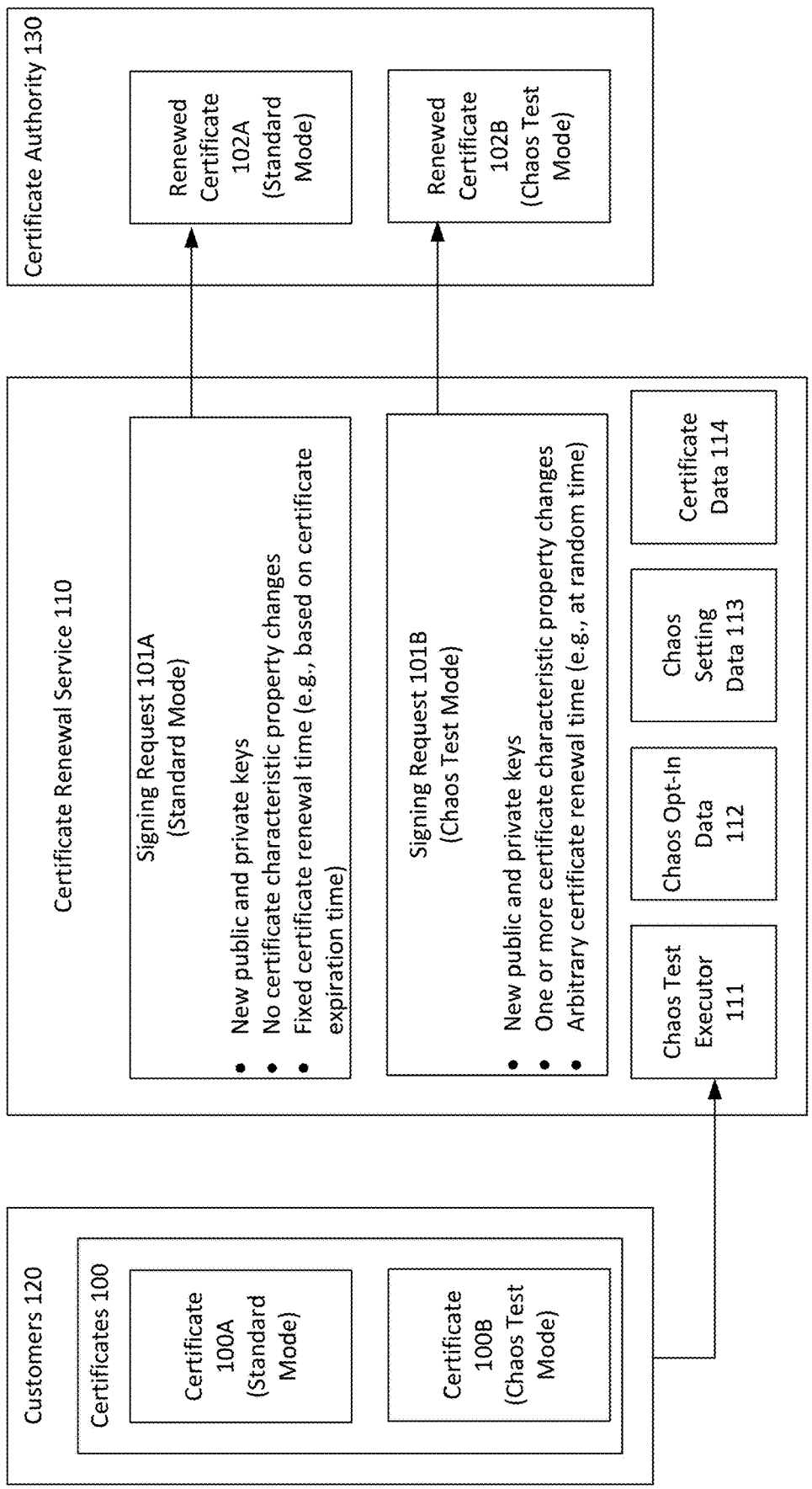
FIG. 1 is a diagram illustrating an example chaos mode certificate testing system that may be used in accordance with the present description.

Techniques for certificate chaos test mode are described herein. In some examples, the chaos test mode may be implemented by a certificate renewal service. A certificate renewal service is a service that may assist customers with obtaining and renewing of certificates, for example by generating and issuing signing requests for certificates to certificate authorities. Certificates have certificate characteristics (e.g., key algorithm type, validity duration, key size, key usage, domain name, alternate domain names). In standard operation, a certificate renewal service may request renewal of certificates at a fixed time prior to the expiration of the certificates. For example, for certificates with a thirteen-month validity duration period, a certificate renewal service may request renewal of those certificates two months prior to expiration, which would be at the end of the eleventh month of the certificate validity period. Typically, when requesting renewal of a certificate, the certificate renewal service may generate new public and private keys for the certificate. However, the properties of certificate characteristics may typically remain unchanged when the certificate is renewed. As referred to herein, the values of the certificate public and private keys are not considered to be certificate characteristic properties.

In some examples, certificates may be used to provide security related to communications between parties, such as a certificate-providing party that presents a certificate to a certificate-receiving party. For example, during an initial communications handshake, a certificate-receiving party may elect to accept a given certificate provided by the certificate-providing party to allow communications with the certificate-providing party. However, the process of renewing certificates is typically asynchronous with respect to use of the certificates between parties. Thus, in some cases, a certificate may be renewed and updated during a communications session between parties. In this scenario, the renewed certificate may be provided to the certificate-receiving party. The certificate-receiving party may then evaluate the renewed certificate to confirm that the renewed certificate remains acceptable. If, for some reason, the certificate-receiving part doesn't accept the new certificate, then the communications session may break.

In some examples, it may be advantageous to evaluate the effects of changed certificate characteristic properties, such as by evaluating the behavior of certificate-receiving parties and certificate-providing parties when certificate characteristic properties are changed. For example, in some cases, it may be advantageous to determine if changing of some characteristic properties causes communications to break more frequently than changing of other characteristic properties. As another example, it may be advantageous to determine which types of parties, certificate usage contexts, etc. may be more sensitive, or less sensitive, to certain types of characteristic property changes. However, in standard operation, the ability to test the effects of characteristic property changes may be limited. One reason for this is that, as noted above, the characteristic properties of a certificate may not change when performing standard certificate renewals.

As described herein, a certificate renewal service may provide a chaos test mode. For certificates for which chaos test mode is enabled, the certificate renewal service may automatically change one or more characteristic properties of the certificate when requesting renewal of the certificate. By changing characteristic properties when the certificate is renewed, this may allow test data to be collected regarding the effects of changed characteristic properties on the chaos test mode certificates. In addition to changing the characteristic properties, the certificate renewal service may also request renewal of chaos test mode certificates at an arbitrary time, such as a randomly determined time. This may allow certificates in the chaos test mode to be renewed more frequently than standard certificates, which are typically not renewed until a fixed time period closer to their expiration dates. By allowing more frequent renewal of chaos mode certificates, the amounts of test data for changed characteristic properties may also be increased.

In some examples, customers of the certificate renewal service may choose to opt-in or opt-out of the chaos test mode. Customers may be permitted to opt-in or opt-out at any desired time. Moreover, customers may be able to select different types of certificates for which to opt-in or opt-out of the chaos test mode. In yet other examples, each customer may select a given amount (e.g., quantity, ratio, percentage, etc.) of its certificates for which to opt-in or opt-out of the chaos test mode. These amounts may also vary depending upon factors such as time, date, certificate type, and the like.

In some examples, the certificate renewal service may automatically change one or more certificate characteristic properties when requesting renewal of chaos test mode certificates without any input from customers (other than merely opting-in to the chaos test mode). In some other examples, the certificate renewal service may automatically change one or more certificate characteristic properties when requesting renewal of chaos test mode certificates based, at least in part, on one or more customer-selected settings. In some examples, the certificate renewal service may change a property of only one certificate characteristic each time that a given certificate is renewed. In other examples, the certificate renewal service may change properties of more than one, and in some cases all, certificate characteristics each time that a given certificate is renewed. In some examples, the quantity of certificate characteristics for which properties are changed at certificate renewal may be determined by customers, by the certificate renewal service, at random, and/or using other techniques. Also, in some examples, the selection of which certificate characteristics for which properties are changed when requesting certificate renewal, as well as the properties to which those specific certificate characteristics are changed, may also be determined by customers, by the certificate renewal service, at random, and/or using other techniques. In some examples, customers may specify any given certificate characteristics for which properties may, or may not, be changed, as well as a frequency with which those the properties of those certificate characteristics may be changed. Also, in some examples, customers may specify any given properties to which one or more characteristic properties may, or may not, be changed, as well as a frequency with which those properties may be used. Customers may also optionally select settings regarding the renewal times for chaos test mode certificates. For example, customers may be permitted to set upper and lower boundaries on the times at which chaos mode certificates are renewed (e.g., not earlier than two months after issuance, not later than two months prior to expiration, etc.).

FIG. 1 is a diagram illustrating an example chaos mode certificate testing system that may be used in accordance with the present description. As shown in FIG. 1, certificate renewal service 110 assists customers 120 with obtaining and renewing of certificates 100, which may include generating and issuing of signing requests 101A and 101B as described below. For example, as part of the renewal process, the certificate renewal service 110 may request renewal of certificates 100A and 100B, such as by issuing signing requests 101A and 101B to certificate authority 130. It is noted, however, that the certificate renewal service 110 need not perform all aspects of the renewal process. For example, the certificate authority 130 may sign the signing requests 101A and 101B to result in renewed certificates 102A and 102B as also described in detail below. The certificate renewal service 110 may also be referred to as a certificate management service. In the example of FIG. 1, certificates 100 include certificate 100A, which is renewed in standard mode, and certificate 100B, which is renewed in chaos test mode. It is noted that, while certificates 100 of FIG. 1 include only certificates 100A and 100B, the certificate renewal service 110 may request renewal of any number of other certificates (not shown in FIG. 1) in standard mode and/or chaos test mode. In the standard mode, the certificate renewal service 110 requests certificate renewal at a fixed time prior to certificate expiration. In one specific example, if certificate 100A has a thirteen-month validity duration period, the certificate renewal service 110 may request renewal of certificate 100A two months prior to expiration, which would be at the end of the eleventh month of the certificate validity period. Additionally, in the standard mode, the properties of certificate characteristics (e.g., key algorithm type, validity duration, key size, key usage, domain name, alternate domain names) may remain unchanged during certificate renewal.

Certificate 100A is renewed in the chaos test mode. As described herein, the certificate renewal service 110 may provide the chaos test mode as an optional mode into which customers 120 may opt-in or opt-out. For certificate 100A, for which chaos test mode is enabled, the certificate renewal service 110 may automatically change one or more characteristic properties of the certificate 100B when requesting renewal of the certificate 100B. By changing characteristic properties when requesting the renewal of certificate 100B, this may allow test data to be collected regarding the effects of changed characteristic properties on certificate 100B as well as other chaos test mode certificates. In addition to changing the characteristic properties, the certificate renewal service 110 may also request renewal of certificate 100B, and other chaos test mode certificates, at arbitrary times, such as randomly determined times. This may allow certificate 100B, and other chaos test mode certificates, to be renewed more frequently than standard certificates, which are typically not renewed until a fixed time period closer to their expiration dates. By allowing more frequent renewal of chaos mode certificates, more test data for changed characteristic properties may be obtained and analyzed.

As shown in FIG. 1, certificate renewal service 110 may generate a signing request 101A for renewing certificate 100A, which is renewed in the standard renewal mode. The certificate renewal service 110 may then submit the signing request 101A to certificate authority 130, which may sign the signing request 101A for renewed certificate 102A. Specifically, the certificate renewal service 110 may generate new public and private keys for renewed certificate 102A, which replace the previous public and private keys in certificate 100A. As referred to herein, the values of the certificate public and private keys are not considered to be certificate characteristic properties. It is noted that properties of some certificate characteristics that are related to the certificate public and private keys, such as the key signing algorithm and the key size, are certificate characteristic properties. However, it is noted that the actual values of the certificate public and private keys (or any portions thereof) are not considered to be certificate characteristic properties as that term is used herein.

The certificate renewal service 110 may include the new certificate public and private keys for renewed certificate 102A in signing request 101A. Because certificate 100A is renewed in standard mode, the signing request 101A may be issued at the designated fixed renewal time based on the expiration date of certificate 100A (e.g., two months prior to expiration of certificate 100A). The signing request 101A may also indicate certificate characteristic properties for renewed certificate 102A. Because certificate 100A is renewed in standard mode, the characteristic properties for renewed certificate 102A are the same as the characteristic properties of certificate 100A.

The certificate renewal service 110 may also generate a signing request 101B for renewing certificate 100B. The certificate renewal service 110 may then submit the signing request 101B to certificate authority 130, which may sign the signing request 101B for renewed certificate 102B. Specifically, the certificate renewal service 110 may generate new public and private keys for renewed certificate 102B, which replace the previous public and private keys in certificate 100B.

The certificate renewal service 110 may include the new certificate public and private keys for renewed certificate 102B in signing request 101B. Because certificate 100B is renewed in chaos test mode, the signing request 101B may be issued at an arbitrary renewal time, such as a randomly determined time. It is noted, however, that the arbitrary (e.g., random) time will be prior to the expiration time of the certificate 100B. The signing request 101B may also indicate certificate characteristic properties for renewed certificate 102B. Because certificate 100B is renewed in chaos test mode, at least one characteristic property for renewed certificate 102B may be different than a characteristic property that was used for certificate 100B.

The certificate renewal service 110 includes a chaos test executor 111, which assists in requesting renewal of certificates for which the chaos test mode is enabled. In some examples, customers 120 may communicate with chaos test executor 111 to opt-in or opt-out of the chaos test mode. Each of customers 120 may be permitted to opt-in or opt-out at any desired time. Moreover, each of customers 120 may be able to select different types of certificates for which to opt-in or opt-out of the chaos test mode. In yet other examples, each of customers 120 may select a given amount (e.g., quantity, ratio, percentage, etc.) of its certificates for which to opt-in or opt-out of the chaos test mode. These amounts may also vary depending upon factors such as time, date, certificate type, and the like. In some examples, the certificate renewal service 110 may provide one or more user interfaces that are made available to customers 120 and that allow the customers 120 to make chaos test mode opt-in and opt-out selections, such as those described above. Upon receipt of chaos test mode opt-in and opt-out selections from customers 120, the chaos test executor may store the received customer selections in chaos opt-in data 112.

In some examples, the certificate renewal service 110 may automatically change one or more certificate characteristic properties when requesting renewal of chaos test mode certificates without any input from customers (other than merely opting-in to the chaos test mode). In some other examples, the certificate renewal service 110 may automatically change one or more certificate characteristic properties when requesting renewal of chaos test mode certificates based, at least in part, on one or more customer-selected settings. As shown in FIG. 1, the chaos test executor 111 may also maintain chaos setting data 113, which includes data regarding customer-selected settings for renewal of chaos test mode certificates. For example, in some cases, the chaos test executor 111 may change a property of only one certificate characteristic each time that a given certificate is renewed. In other examples, the chaos test executor 111 may change properties of more than one, and in some cases all, certificate characteristics each time that a given certificate is renewed. In some examples, the quantity of certificate characteristics for which properties are changed when requesting certificate renewal may be determined by customers 120, by the certificate renewal service 110, at random, and/or using other techniques. Also, in some examples, the selection of which certificate characteristics for which properties are changed when requesting certificate renewal, as well as the properties to which those specific certificate characteristics are changed, may also be determined by customers 120, by the certificate renewal service 110, at random, and/or using other techniques. In some examples, customers 120 may specify any given certificate characteristics for which properties may, or may not, be changed, as well as a frequency with which those the properties of those certificate characteristics may be changed. Also, in some examples, customers 120 may specify any given properties to which one or more characteristic properties may, or may not, be changed, as well as a frequency with which those properties may be used. Customers 120 may also optionally select settings regarding the renewal times for chaos test mode certificates. For example, customers 120 may be permitted to set upper and lower boundaries on the times at which chaos mode certificates are renewed (e.g., not earlier than two months after issuance, not later than two months prior to expiration, etc.). In some examples, customers 120 may select chaos test mode settings via one or more user interfaces that may be provided by chaos test executor 111. Upon receipt of chaos test mode setting selections from customers 120, the chaos test executor may store the received customer selections in chaos setting data 113.

As also shown in FIG. 1, the certificate renewal service 110 may maintain certificate data 114, which is data regarding certificates that the certificate renewal service 110 assists in renewing. For example, for each certificate that the certificate renewal service 110 assists in renewing, the certificate data 114 may indicate current characteristic properties for that certificate, as well as related metadata, such as the issue date, the expiration date, and the like.

In some examples, the chaos test executor 111 may request renewal of chaos test mode certificates based, at least in part, on the chaos opt-in data 112, the chaos setting data 113, and the certificate data 114. For example, the chaos test executor 111 may access chaos opt-in data 112 to determine, at any given time, which of the certificates that are managed by certificate renewal service 110 are chaos test mode certificates, meaning that chaos test mode is enabled for those certificates. For each chaos test mode certificate, the chaos test executor 111 may access certificate data 114 to determine an expiration time for the certificate. In some examples, the chaos test executor 111 may then determine an arbitrary (e.g., random) renewal time for the certificate that is prior to the expiration time for the certificate. The arbitrary renewal time may also be determined in accordance with any customer-selected renewal settings that may be specified in chaos setting data 113.

The chaos test executor 111 may also consult certificate data 114 to determine current certificate characteristic properties for the certificate. The chaos test executor 111 may then select new characteristic properties for the certificate that will be applied to the certificate when the certificate is renewed. As described above, the new characteristic properties will include at least one characteristic property that differs from a respective current characteristic property for the certificate. In some examples, the new characteristic properties may be determined completely at random. In some other examples, the new characteristic properties may be determined partially at random, such as by being limited based on settings specified in chaos setting data 113. Specifically, the new characteristic properties may be selected in accordance with any characteristic property settings that are applicable to the certificate and that may be specified in chaos setting data 113. For example, chaos setting data 113 may indicate a quantity of certificate characteristics for which properties will be changed, specific certificate characteristics for which properties may, or may not, be changed, specific properties to which characteristics may, or may not, be changed, and other settings.

Figure 2:
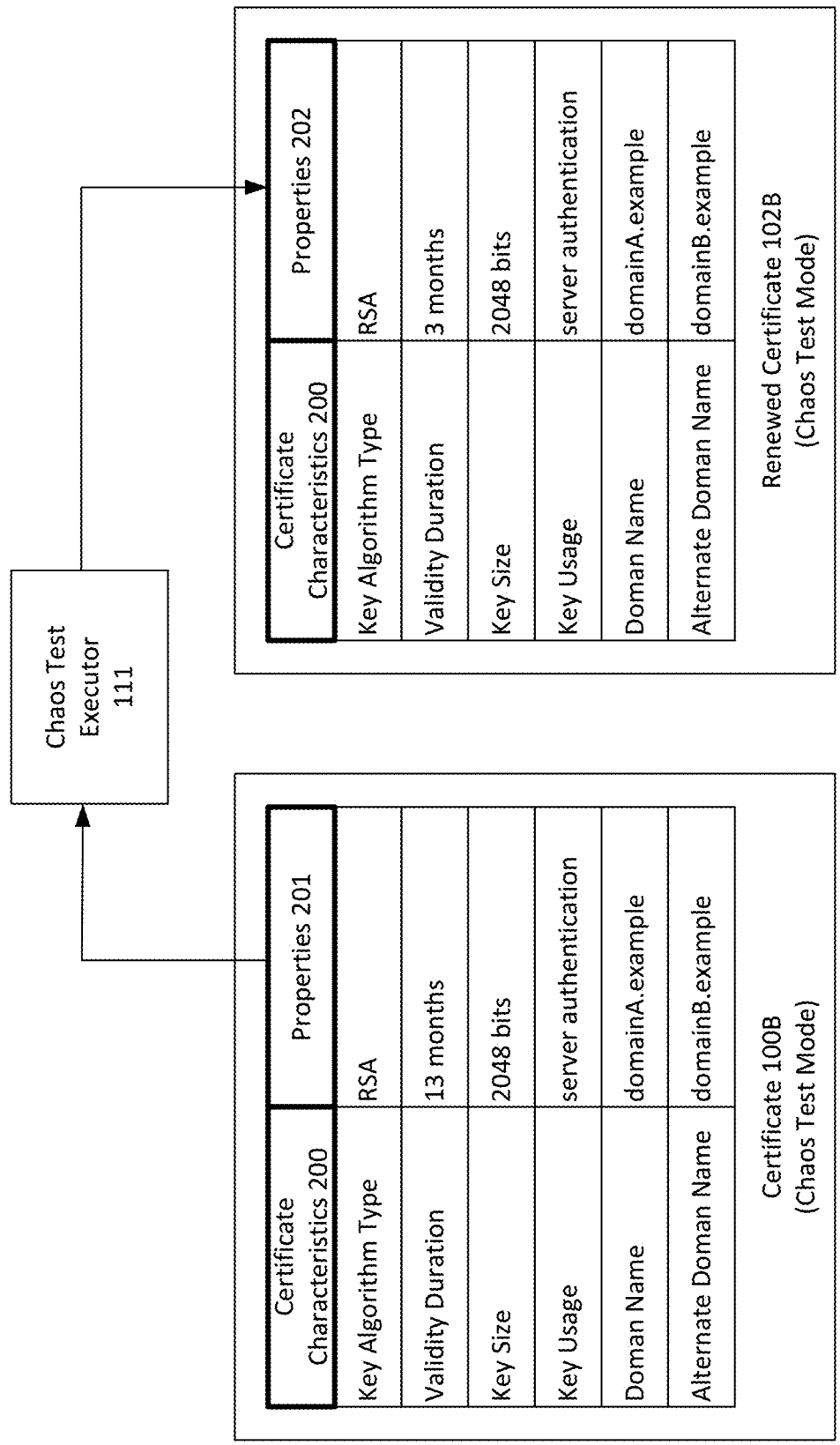
FIG. 2 is a diagram illustrating an example of a single characteristic property change in chaos test mode that may be used in accordance with the present description.

Referring now to FIG. 2, an example of a single certificate characteristic property change in chaos test mode will now be described in detail. As shown in FIG. 2, certificate 100B is renewed in chaos test mode to form renewed certificate 102B. Both certificate 100B and renewed certificate 102B have certificate characteristics 200. In this example, certificate characteristics 200 include key algorithm type, validity duration, key size, key usage, domain name, and alternate domain name. Specifically, key algorithm type indicates a type of certificate key algorithm (e.g., Rivest-Shamir-Adleman (RSA), elliptic, etc.), validity duration indicates a certificate's validity duration period (e.g., thirteen months, three months, two months, etc.), key size indicates a size of the certificate keys (e.g., 2048 bits, 3072 bits, 4096 bits, etc.), key usage indicates a certificate's permitted usage (e.g., server authentication, client authentication, code signing, email, etc.), domain name indicates a domain for which a certificate's usage is permitted, and alternate domain name indicates an alternate domain for which a certificate's usage is permitted. As shown in FIG. 2, certificate 100B has properties 201, which are certificate characteristic properties for certificate 100B. In this example, properties 201 include RSA (for the key algorithm type characteristic), thirteen months (for the validity duration characteristic), 2048 bits (for the key size characteristic), server authentication (for the key usage characteristic), domanA.example (for the domain name characteristic), and domanB.example (for the alternate domain name characteristic).

As also shown in FIG. 2, renewed certificate 102B has properties 202, which are certificate characteristic properties for renewed certificate 102B. Because certificate 100B is renewed in the chaos test mode, at least one of properties 202 for renewed certificate 102B will differ from a respective one of properties 201 for certificate 100B. In the example of FIG. 2, properties 202 include only a single property that differs from a respective one of properties 201. Specifically, in properties 202, the validity duration is changed from thirteen months (in properties 201) to three months. The change in validity duration (from thirteen months to three months) is the only change from properties 201 to properties 202. It is noted that the certificate properties 202 may be included, by the certificate renewal service 110, in the signing request 101B that is issued by the certificate renewal service 110 to the certificate authority 130. The inclusion of the properties 202 in the signing request 101B may cause the properties 202 to be applied to the renewed certificate 102B.

Figure 3:
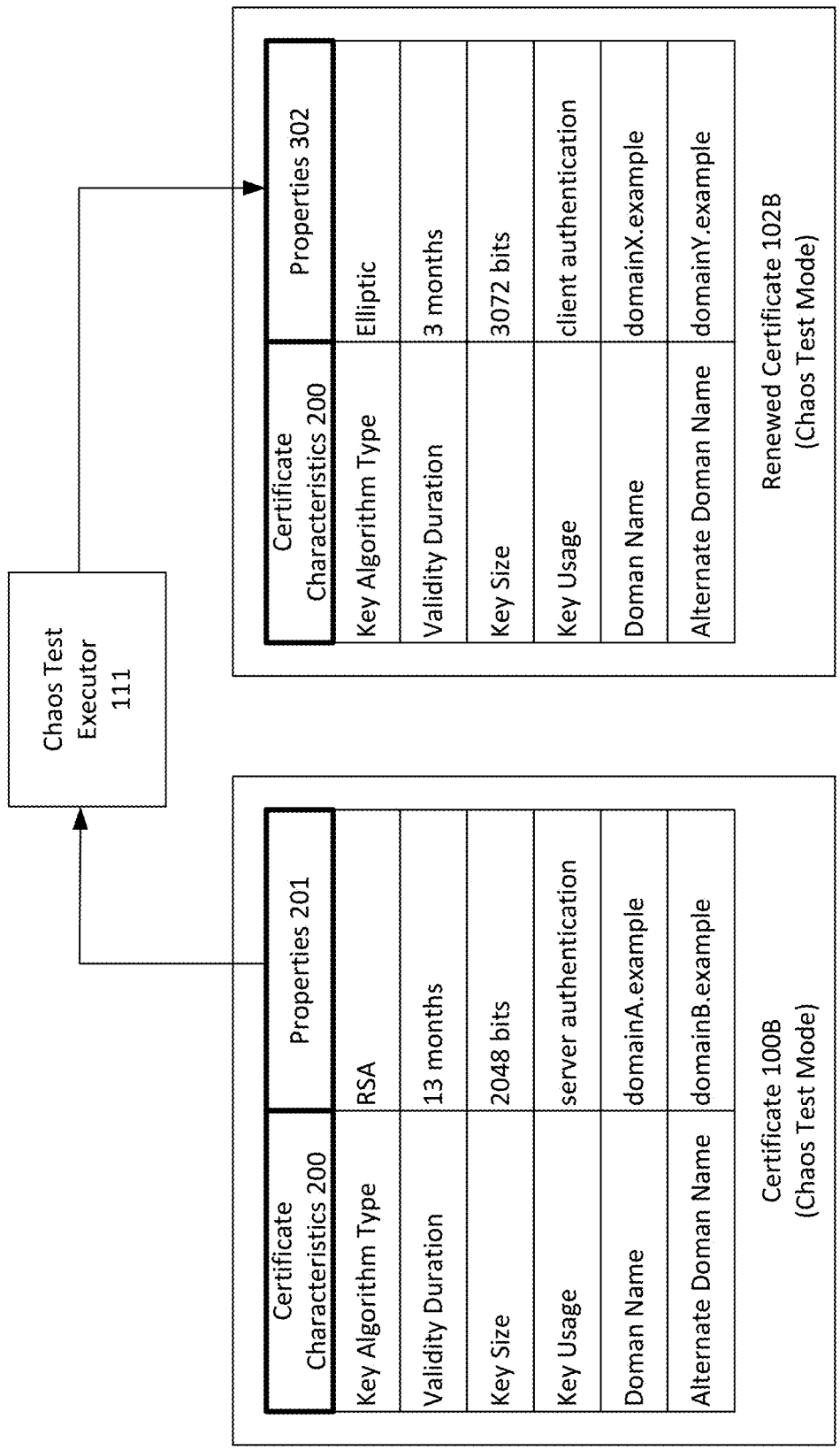
FIG. 3 is a diagram illustrating an example of a plurality of characteristic property changes in chaos test mode that may be used in accordance with the present description.

While FIG. 2 shows an example in which only a single property change is made when renewing certificate 100B, there may be scenarios in which multiple characteristic property changes are made. Referring now to FIG. 3, an example of a plurality of certificate characteristic property changes in chaos test mode will now be described in detail. As shown in FIG. 3, both certificate 100B and renewed certificate 102B have certificate characteristics 200, which are the same as those shown in FIG. 2. Additionally, certificate 100B has properties 201, which are the same as those shown for certificate 100B in FIG. 2. However, in the example of FIG. 3, renewed certificate 102B has properties 302. In the example of FIG. 2, each one of properties 302 differ from a respective one of properties 201. Specifically, in properties 302, the key algorithm type is changed from RSA (in properties 201) to elliptic. Also, in properties 302, the validity duration is changed from thirteen months (in properties 201) to three months. Also, in properties 302, the key size is changed from 2048 bits (in properties 201) to 3072 bits. Also, in properties 302, the key usage is changed from server authentication (in properties 201) to client authentication. Also, in properties 302, the domain name is changed from domainA.example (in properties 201) to domainX.example. Also, in properties 302, the alternate domain name is changed from domainB.example (in properties 201) to domainY.example. It is noted that the certificate properties 302 may be included, by the certificate renewal service 110, in the signing request 101B that is issued by the certificate renewal service 110 to the certificate authority 130. The inclusion of the properties 302 in the signing request 101B may cause the properties 302 to be applied to the renewed certificate 102B.

Figure 4:
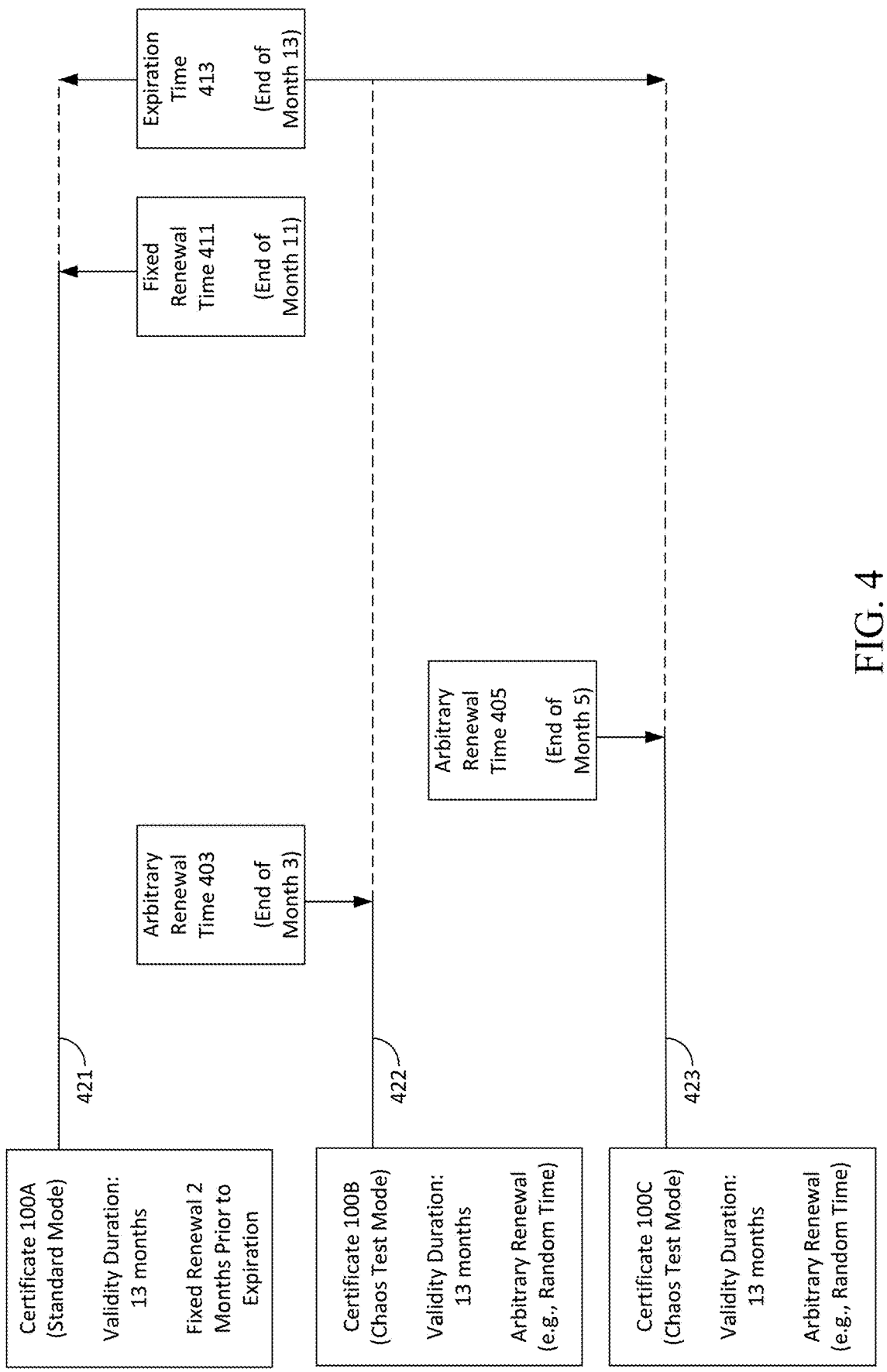
FIG. 4 is a diagram illustrating example chaos test mode and standard mode certificate renewals that may be used in accordance with the present description.

As described above, in addition to changing the characteristic properties of chaos test mode certificates, the certificate renewal service 110 may also request renewal of chaos test mode certificates at an arbitrary time, such as a randomly determined time. This may allow certificates in the chaos test mode to be renewed more frequently than standard certificates, which are typically not renewed until a fixed time period closer to their expiration dates. By allowing more frequent renewal of chaos mode certificates, the amounts of test data for changed characteristic properties may also be increased. Referring now to FIG. 4, some example renewal times for certificates in chaos test mode and in standard renewal mode will now be described in detail. In this example, certificate 100A is renewed in standard mode, while certificates 100B and 100C are renewed in chaos test mode. As shown, each of certificates 100A-C has an identical validity duration of thirteen months. Accordingly, each of certificates 100A-C has an expiration time 413 that occurs at the end of month thirteen.

In the example of FIG. 4, all standard renewal mode certificates that have a thirteen-month validity duration are renewed at a fixed renewal time 411 that is eleven months after their issuance, which is two months prior to the expiration time 413. Thus, as shown in FIG. 4, certificate 100A, which is renewed in the standard renewal mode, is renewed at the fixed renewal time 411 at the end of month eleven. Timeline 421, which increases in time from left to right, indicates the state of certificate 100A. Specifically, timeline 421 is a solid line for the first eleven months after issuance of certificate 100A, which is shown to the left of fixed renewal time 411. The solid portion of timeline 421 corresponds to the time-period before certificate 100A is renewed. To the right of fixed renewal time 411, timeline 421 changes from a solid line to a dashed line, thereby indicating that the certificate 100A has been renewed.

As also shown in FIG. 4, certificate 100B is renewed in the chaos test mode. Accordingly, certificate 100B is renewed at an arbitrarily (e.g., randomly) determined time. In this example, the arbitrary renewal time 403, which is selected for certificate 100B, is the end of the third month after the issuance of certificate 100B. In some examples, arbitrary renewal time 403 may be selected at random. Timeline 422, which increases in time from left to right, indicates the state of certificate 100B. Specifically, timeline 422 is a solid line for the first three months after issuance of certificate 100B, which is shown to the left of arbitrary renewal time 403. The solid portion of timeline 422 corresponds to the time-period before certificate 100B is renewed. To the right of arbitrary renewal time 403, timeline 422 changes from a solid line to a dashed line, thereby indicating that the certificate 100B has been renewed.

As also shown in FIG. 4, certificate 100C is also renewed in the chaos test mode. Accordingly, certificate 100C is renewed at an arbitrarily (e.g., randomly) determined time. In this example, the arbitrary renewal time 405, which selected for certificate 100C, is the end of the fifth month after the issuance of certificate 100C. Thus, even though certificates 100B and 100C have the same validity duration (thirteen months) they are renewed at different times (e.g., the end of month three and the end of month five). In some examples, arbitrary renewal time 405 may be selected at random. Timeline 423, which increases in time from left to right, indicates the state of certificate 100C. Specifically, timeline 423 is a solid line for the first five months after issuance of certificate 100C, which is shown to the left of arbitrary renewal time 405. The solid portion of timeline 423 corresponds to the time-period before certificate 100C is renewed. To the right of arbitrary renewal time 405, timeline 423 changes from a solid line to a dashed line, thereby indicating that the certificate 100C has been renewed.

Figure 5:
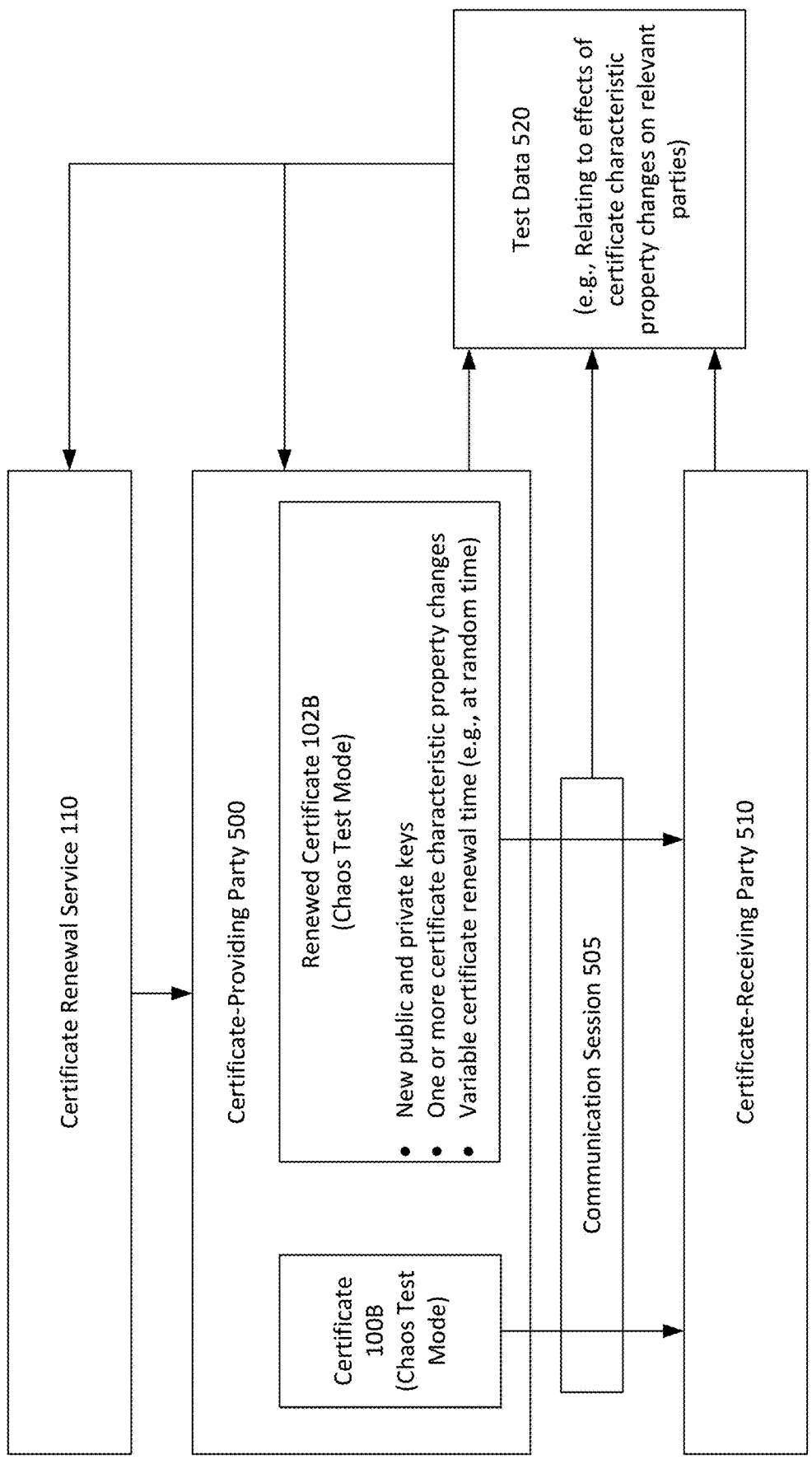
FIG. 5 is a diagram illustrating example chaos mode test data that may be used in accordance with the present description.
Figure 7:
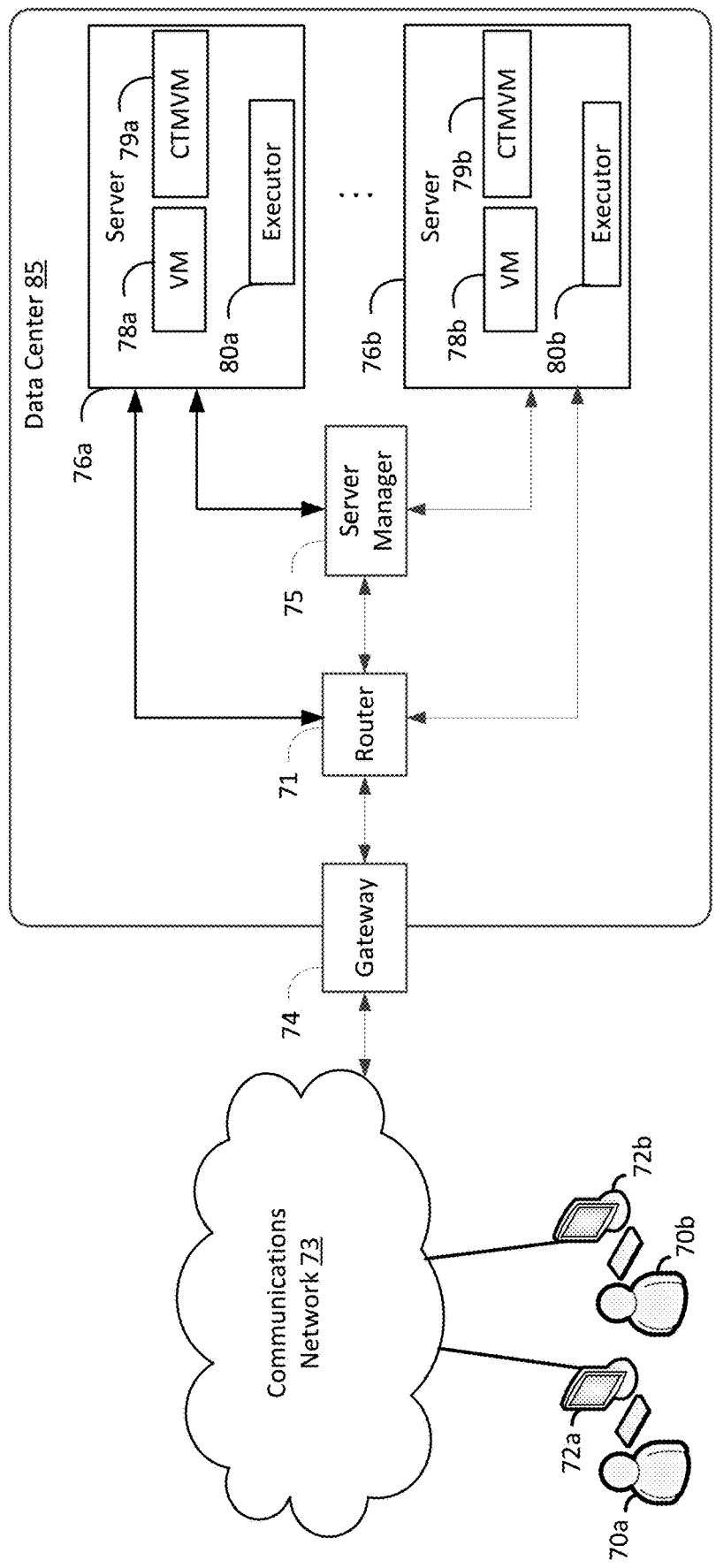
FIG. 7 is a diagram illustrating an example system for transmitting and providing data that may be used in accordance with the present description.

As described above, chaos test mode certificates may be used to assist in testing the effects of certificate characteristic property changes such as by evaluating the behavior of certificate-receiving parties and certificate-providing parties when certificate characteristic properties are changed. For example, in some cases, it may be advantageous to determine if changing of some characteristic properties causes communications to break more frequently than changing of some other characteristic properties. As another example, it may be advantageous to determine which types of parties, certificate usage contexts, etc. may be more sensitive, or less sensitive, to certain types of characteristic property changes. Referring now to FIG. 5, an example is shown in which test data 520 may be collected. As shown in FIG. 5, certificate 100B assists in establishing a communication session 505 between certificate-providing party 500 and certificate-receiving party 510. For example, during an initial handshake, certificate-receiving party 510 may elect to accept certificate 100B provided by the certificate-providing party 500 to allow communications with the certificate-providing party 500. However, the process of renewing certificates is typically asynchronous with respect to use of the certificates between parties.

In the example of FIG. 5, certificate 100B is renewed while communications session 505 is in progress. In this scenario, the renewed certificate 102B is provided to the certificate-receiving party 510. The certificate-receiving party 510 may then evaluate the renewed certificate 102B to confirm that the renewed certificate 102B remains acceptable. If, for some reason, the certificate-receiving party 510 doesn't accept the renewed certificate 102B, then the communications session 505 may break. Because certificate 100B is renewed in chaos test mode, renewed certificate 102B will have at least one different certificate characteristic property relative to certificate 100B. In some examples, if the certificate-receiving party 510 doesn't accept any of these one or more different certificate characteristic properties of renewed certificate 102B, then the communications session 505 may break.

In the example of FIG. 5, test data 520 may be collected by certificate-providing party 500, certificate renewal service 110 and/or any number of other parties. The test data 520 relates to effects of certificate characteristic property changes on relevant parties (e.g., certificate-receiving party 510 and certificate-providing party 500). For example, the test data 520 may indicate whether, or not, the issuance of renewed certificate 102B causes communications session 505 to break. In some examples, the test data 520 may include data regarding certificate 100B, such as indications of the certificate characteristic properties of certificate 100B. Additionally, the test data 520 may include data regarding renewed certificate 102B, such as indications of the certificate characteristic properties of renewed certificate 102B. The test data 520 may also indicate the differences between the certificate characteristic properties of certificate 100B and the certificate characteristic properties of renewed certificate 102B. The test data 520 may include data regarding certificate-receiving party 510 and/or certificate-providing party 500, such as the type of party (e.g., client, server, etc.), device type, Internet Protocol (IP) address, domain name, and the like. The test data 520 may also include data regarding communications session 505, such as the time, date, session length, communication type, network types, and the like.

In some examples, the certificate renewal service 110, or another party, may receive test data 520 as well as other test data from other chaos mode certificates. The certificate renewal service 110 may then store and analyze the collected test data, such as to provide reports to customers 120. For example, reports may be aggregated based on any, or all, of the above-described, or other, test data features. For example, reports may be generated to show the effects of changing particular certificate characteristics properties, such as by showing how frequently those changes cause communications sessions to break, for example for various different types of certificate-receiving parties and/or certificate-providing parties.

FIG. 6 is a flowchart illustrating an example chaos mode certificate testing process that may be used in accordance with the present description. At operation 610, an indication is received, by a certificate renewal service, to request renewal of a certificate in a test mode (e.g., chaos test mode) that allows testing of certificate characteristic property change effects. As described in detail above, the test mode (e.g., chaos test mode) may allow testing of certificate characteristic property change effects by causing one or more certificate characteristic properties to be automatically changed when requesting certificate renewal as well as optionally causing certificates to be renewed at arbitrary (e.g., random) times. In some examples, operation 610 may include receiving, by the certificate renewal service, from a customer, the indication, wherein the indication is a customer request to opt-in to the test mode. In some examples, customers of the certificate renewal service may choose to opt-in or opt-out of the chaos test mode. Customers may be permitted to opt-in or opt-out at any desired time. Moreover, customers may be able to select different types of certificates for which to opt-in or opt-out of the chaos test mode. In yet other examples, each customer may select a given amount (e.g., quantity, ratio, percentage, etc.) of its certificates for which to opt-in or opt-out of the chaos test mode. These amounts may also vary depending upon factors such as time, date, certificate type, and the like. In some examples, the indication received at operation 610 may explicitly identify the certificate that will be renewed in the test mode. However, there is no requirement that the indication received at operation 610 must explicitly identify the certificate that will be renewed in the test mode. For example, in some cases, the indication received at operation 610 may merely indicate that the customer wishes to opt-in to chaos test mode, and this opt-in may, by default, apply to all of the customer's certificates unless specified otherwise. In yet other examples, the indication received at operation 610 may indicate that the customer is selecting a given amount (e.g., quantity, ratio, percentage, etc.) of its certificates for which to opt-in to the chaos test mode, and the specific certificates that are included in the chaos test mode may be selected at random by the certificate renewal service.

At operation 612, the certificate renewal service selects, based on the renewal of the certificate being requested in the test mode, a renewal time for renewing the certificate. The renewal time may be a randomly determined time prior to the expiration of the certificate. As described above, the certificate renewal service may request renewal of chaos test mode certificates at an arbitrary time, such as a randomly determined time. This may allow certificates in the chaos test mode to be renewed more frequently than standard certificates, which are typically not renewed until a fixed time period closer to their expiration dates. By allowing more frequent renewal of chaos mode certificates, the amounts of test data for changed characteristic properties may be increased. For example, as described above with reference to FIG. 4, certificate 100B, which is renewed in chaos test mode, is renewed at an arbitrary renewal time 403, which is at the end of the third month after its issuance. By contrast, certificate 100C, which is also renewed in chaos test mode, is renewed at an arbitrary renewal time 405, which is at the end of the fifth month after its issuance. Thus, even though certificates 100B and 100C both have a validity duration of thirteen months, they are renewed at different time periods (three months and five months) after they are issued.

At operation 614, the certificate renewal service changes, based on the renewal of the certificate being requested in the test mode, one or more properties of one or more certificate characteristics of the certificate in a certificate renewal request. A certificate renewal request may be a signing request, such as signing request 101B of FIG. 1. Operation 614 may include changing the one or more properties of the one or more certificate characteristics of the certificate in the certificate renewal request when generating the certificate renewal request (e.g., the signing request). For example, as described above with reference to FIG. 3, signing request 101B may include properties 302, which include a plurality of property changes relative to properties 201 of certificate 100B. In some examples, the one or more certificate characteristics for which the one or more properties are changed may comprise at least one of a key algorithm type, a key size, a validity duration, a key usage, a domain name, or an alternate domain name. Additionally, in some examples, the changing of the one or more properties may comprise changing the one or more properties to one or more randomly selected properties in the certificate renewal request. Furthermore, in some examples, the certificate renewal service may allow a customer of the certificate renewal service to select at least one certificate characteristic for which respective properties are permitted, or are not permitted, to be changed when requesting renewal of certificates in the test mode. Also, in some examples, the certificate renewal service may allow a customer of the certificate renewal service to select a property to which a certificate characteristic is permitted, or is not permitted, to be changed when requesting renewal of certificates in the test mode. Moreover, in some examples, the certificate renewal service may allow a customer of the certificate renewal service to select a quantity of certificate characteristics for which properties are changed when requesting renewal of certificates in the test mode.

In some examples, the certificate renewal service may automatically perform operation 614 without any input from customers (other than merely opting-in to the chaos test mode). In some other examples, the certificate renewal service may automatically perform operation 614 based, at least in part, on one or more customer-selected settings. As described above with reference to FIG. 1, the chaos test executor 111 may maintain chaos setting data 113, which includes data regarding customer-selected settings for renewal of chaos test mode certificates. For example, in some cases, the chaos test executor 111 may change a property of only one certificate characteristic each time that a given certificate is renewed. In other examples, the chaos test executor 111 may change properties of more than one, and in some cases all, certificate characteristics each time that a given certificate is renewed. In some examples, the quantity of certificate characteristics for which properties are changed when requesting certificate renewal may be determined by customers 120, by the certificate renewal service 110, at random, and/or using other techniques. Also, in some examples, the selection of which certificate characteristics for which properties are changed when requesting certificate renewal, as well as the properties to which those specific certificate characteristics are changed, may also be determined by customers 120, by the certificate renewal service 110, at random, and/or using other techniques. In some examples, customers 120 may specify any given certificate characteristics for which properties may, or may not, be changed, as well as a frequency with which those the properties of those certificate characteristics may be changed. Also, in some examples, customers 120 may specify any given properties to which one or more characteristic properties may, or may not, be changed, as well as a frequency with which those properties may be used. Customers 120 may also optionally select settings regarding the renewal times for chaos test mode certificates. For example, customers 120 may be permitted to set upper and lower boundaries on the times at which chaos mode certificates are renewed (e.g., not earlier than two months after issuance, not later than two months prior to expiration, etc.). In some examples, customers 120 may select chaos test mode settings via one or more user interfaces that may be provided by chaos test executor 111. Upon receipt of chaos test mode setting selections from customers 120, the chaos test executor 111 may store the received customer selections in chaos setting data 113.

As also described above, the chaos test executor 111 may consult certificate data 114 to determine current certificate characteristic properties for the certificate. The chaos test executor 111 may then select new characteristic properties for the certificate that will be applied to the certificate when the certificate is renewed. As described above, the new characteristic properties will include at least one characteristic property that differs from a respective current characteristic property for the certificate. In some examples, the new characteristic properties may be determined completely at random. In some other examples, the new characteristic properties may be determined partially at random, such as by being limited based on settings specified in chaos setting data 113. Specifically, the new characteristic properties may be selected in accordance with any characteristic property settings that are applicable to the certificate and that may be specified in chaos setting data 113. For example, chaos setting data 113 may indicate a quantity of certificate characteristics for which properties will be changed, specific certificate characteristics for which properties may, or may not, be changed, specific properties to which characteristics may, or may not, be changed, and other settings.

At operation 616, the certificate renewal service requests renewal of the certificate based on the renewal time with one or more changes to the one or more properties of the one or more certificate characteristics. As described above, requesting renewal of the certificate may include issuing a signing request for signing of a renewed certificate, such as by sending the signing request to a certificate authority. As described above with reference to FIG. 1, the certificate renewal service 110 may generate a signing request 101B for renewing certificate 100B, which is renewed in chaos test mode. The certificate renewal service 110 may then submit the signing request 101B to certificate authority 130, which may sign the signing request 101B for renewed certificate 102B. Specifically, the certificate renewal service 110 may generate new public and private keys for renewed certificate 102B, which replace the previous public and private keys in certificate 100B.

The certificate renewal service 110 may include the new certificate public and private keys for renewed certificate 102B in signing request 101B. Because certificate 100B is renewed in chaos test mode, the signing request 101B may be issued at an arbitrary renewal time, such as a randomly determined time. It is noted, however, that the arbitrary (e.g., random) time will be prior to the expiration time of the certificate 100B. The signing request 101B may also indicate certificate characteristic properties for renewed certificate 102B. Because certificate 100B is renewed in chaos test mode, at least one characteristic property for renewed certificate 102B may be different than a characteristic property for a respective certificate characteristic that was used for certificate 100B. Thus, the certificate renewal service 110 may include the one or more certificate characteristic property changes in the signing request 101B when requesting renewal of the certificate 100B. In the example of FIG. 2, properties 202 may be included in the signing request 101B. Properties 202 include one property change (for validity duration) relative to properties 201 of certificate 100B. In the example of FIG. 3, properties 302 may be included in the signing request 101B. In FIG. 3, all of properties 302 are changed relative to properties 201 of certificate 100B. The certificate renewal service 110 may then send the signing request 110B, including the one or more changed certificate characteristic properties, to the certificate authority 130 for signing. This causes the certificate 100B to be renewed with the one or more changed certificate characteristic properties.

At operation 618, a certificate renewal request (e.g., signing request) is signed to result in a renewed certificate. As described above, upon receipt of the signing request 101B, the certificate authority 130 may sign the signing request 101B to result in renewed certificate 102B. The renewed certificate 102B may then be presented to a customer. As described above, because the renewed certificate 102B includes one or more changed certificate characteristic properties, the renewed certificate 102B may be used to test the effects of certificate characteristic property changes. As described with reference to FIG. 5, test data 520 may be collected by certificate-providing party 500, certificate renewal service 110 and/or any number of other parties. The test data 520 relates to effects of certificate characteristic property changes on relevant parties (e.g., certificate-receiving party 510 and certificate-providing party 500). For example, the test data 520 may indicate whether, or not, the issuance of renewed certificate 102B causes communications session 505 to break. In some examples, the test data 520 may include data regarding certificate 100B, such as indications of the certificate characteristic properties of certificate 100B. Additionally, the test data 520 may include data regarding renewed certificate 102B, such as indications of the certificate characteristic properties of renewed certificate 102B. The test data 520 may also indicate the differences between the certificate characteristic properties of certificate 100B and the certificate characteristic properties of renewed certificate 102B. The test data 520 may include data regarding certificate-receiving party 510 and/or certificate-providing party 500, such as the type of party (e.g., client, server, etc.), device type, Internet Protocol (IP) address, domain name, and the like. The test data 520 may also include data regarding communications session 505, such as the time, date, session length, communication type, network types, and the like.

Figure 8:
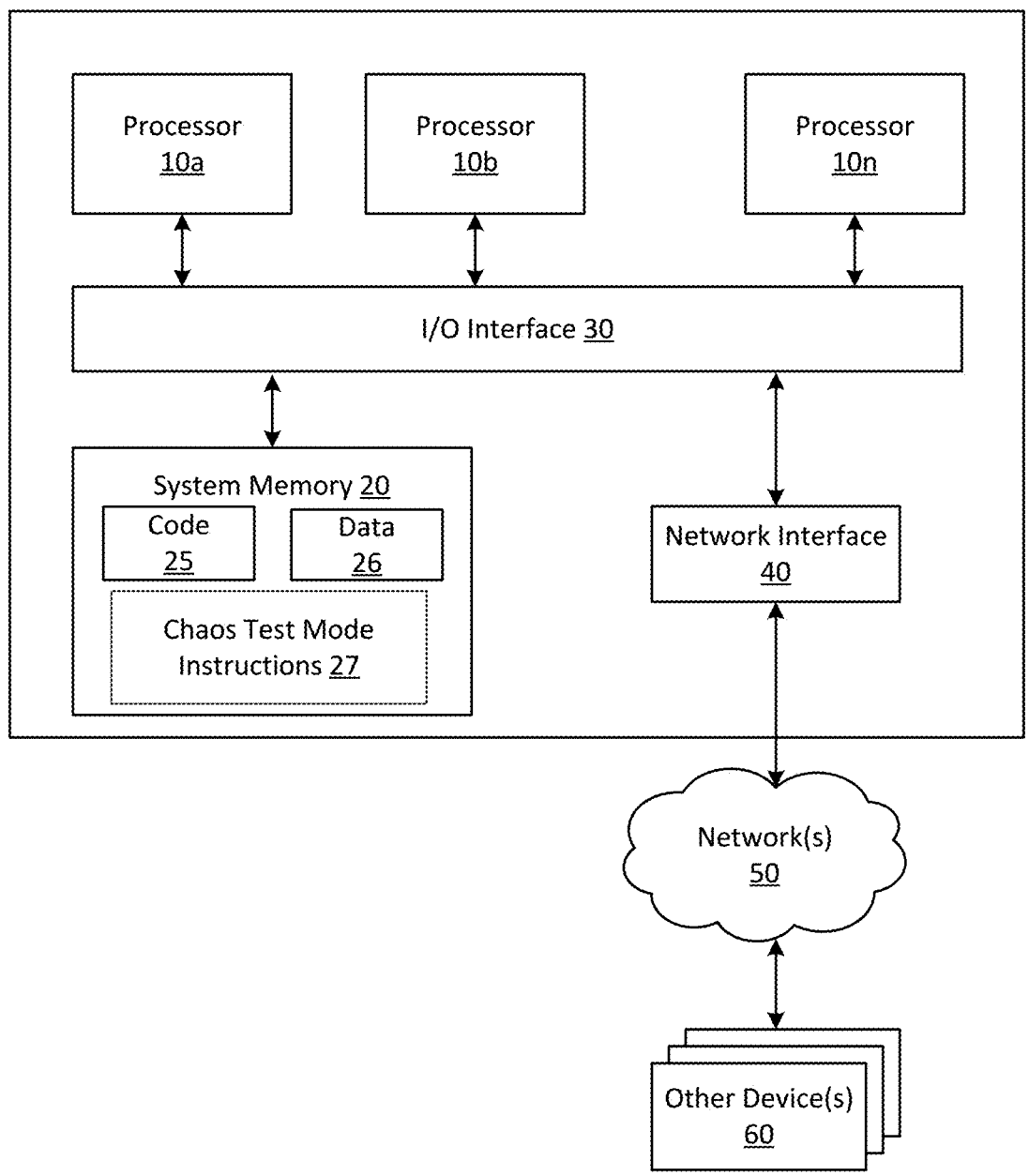
FIG. 8 is a diagram illustrating an example computing system that may be used in accordance with the present description.

An example system for transmitting and providing data will now be described in detail. In particular, FIG. 8 illustrates an example computing environment in which the embodiments described herein may be implemented. FIG. 8 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources-consisting of many processors, large amounts of memory and/or large storage capacity—and small resources-consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-b (which may be referred herein singularly as virtual machine instance 78 or in the plural as virtual machine instances 78). In this example, the resources also include chaos test mode virtual machines (CTMVM's) 79a-b, which are virtual machines that are configured to execute any, or all, of the chaos test mode certificate renewal techniques, and other techniques, described above.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 8, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 8 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 8, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 8, a server manager 75 is also employed to at least in part direct various communications to, from and/or between servers 76a and 76b. While FIG. 8 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 8 has been greatly simplified and that many more networks and networking devices may be utilized to interconnect the various computing systems disclosed herein. These network topologies and devices should be apparent to those skilled in the art.

It should also be appreciated that data center 85 described in FIG. 8 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

In at least some embodiments, a server that implements a portion or all of one or more of the technologies described herein may include a computer system that includes or is configured to access one or more computer-accessible media. FIG. 9 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/FlashR-type memory or any other type of memory. In the illustrated embodiment, program instructions and data implementing one or more desired functions, such as those methods, techniques and data described above, are shown stored within system memory 20 as code 25 and data 26. Additionally, in this example, system memory 20 includes chaos test mode instructions 27, which are instructions for executing any, or all, of the chaos test mode certificate renewal techniques, and other techniques, described above.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations: in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability container of a resource instance is intended to be independent of the availability container of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms: furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
one or more processors; and
one or more memories having stored therein instructions that, upon execution by the one or more processors, cause the computing system to perform computing operations comprising:
receiving, by a certificate renewal service, an indication to request renewal of a certificate in a test mode that allows testing of certificate characteristic property change effects, wherein the certificate renewal service allows a customer to select at least one certificate characteristic for which respective properties are permitted, or are not permitted, to be changed when requesting renewing of certificates in the test mode;
selecting, by the certificate renewal service, based on the renewal of the certificate being requested in the test mode, a renewal time for the renewal of the certificate, wherein the renewal time is a randomly determined time prior to expiration of the certificate;
changing, by the certificate renewal service, based on the renewal of the certificate being requested in the test mode, one or more properties of one or more certificate characteristics of the certificate in a certificate renewal request, wherein the one or more certificate characteristics comprise at least one of a key algorithm type, a key size, a key usage, a domain name, or an alternate domain name; and
requesting, by the certificate renewal service, based on the renewal time, the renewal of the certificate with one or more changes to the one or more properties of the one or more certificate characteristics.

2. The computing system of claim 1, wherein the changing of the one or more properties comprises changing the one or more properties to one or more randomly selected properties when the renewal of the certificate is requested.

3. The computing system of claim 1, wherein the certificate renewal service allows the customer to select a quantity of certificate characteristics for which properties are changed when requesting the renewing of the certificates in the test mode.

4. A computer-implemented method, comprising:
receiving, by a certificate renewal service, an indication to request renewal of a certificate in a test mode that allows testing of certificate characteristic property change effects, wherein the certificate renewal service allows a customer to select at least one certificate characteristic for which respective properties are permitted, or are not permitted, to be changed when requesting renewal of certificates in the test mode;
selecting, by the certificate renewal service, based on the renewal of the certificate being requested in the test mode, a renewal time for the renewal of the certificate;
changing, by the certificate renewal service, based on the renewal of the certificate being requested in the test mode, one or more properties of one or more certificate characteristics of the certificate in a certificate renewal request, wherein the one or more certificate characteristics comprise at least one of a key algorithm type, a key size, a key usage, a domain name, or an alternate domain name; and
requesting, by the certificate renewal service, based on the renewal time, the renewal of the certificate with one or more changes to the one or more properties of the one or more certificate characteristics.

5. The computer-implemented method of claim 4, wherein the renewal time is a randomly determined time prior to expiration of the certificate.

6. The computer-implemented method of claim 4, wherein the changing of the one or more properties comprises changing the one or more properties to one or more randomly selected properties in the certificate renewal request.

7. The computer-implemented method of claim 4, wherein the receiving, by the certificate renewal service, the indication to request the renewal of the certificate in the test mode comprises:

receiving, by the certificate renewal service, from the customer, the indication, wherein the indication is a customer request to opt-in to the test mode.

8. The computer-implemented method of claim 4, wherein the certificate renewal service allows the customer to select a property to which a certificate characteristic is permitted, or is not permitted, to be changed when requesting the renewal renewing of the certificates in the test mode.

9. The computer-implemented method of claim 4, wherein the certificate renewal service allows the customer to select a quantity of certificate characteristics for which properties are changed when requesting the renewal renewing of the certificates in the test mode.

10. One or more non-transitory computer-readable storage media having stored thereon computing instructions that, upon execution by one or more computing devices, cause the one or more computing devices to perform computing operations comprising:

receiving, by a certificate renewal service, an indication to request renewal of a certificate in a test mode that allows testing of certificate characteristic property change effects, wherein the certificate renewal service allows a customer to select at least one certificate characteristic for which respective properties are permitted, or are not permitted, to be changed when requesting renewal of certificates in the test mode;

selecting, by the certificate renewal service, based on the renewal of the certificate being requested in the test mode, a renewal time for the renewal of the certificate;

changing, by the certificate renewal service, based on the renewal of the certificate being requested in the test mode, one or more properties of one or more certificate characteristics of the certificate in a certificate renewal request, wherein the one or more certificate characteristics comprise at least one of a key algorithm type, a key size, a key usage, a domain name, or an alternate domain name; and requesting, by the certificate renewal service, based on the renewal time, the renewal of the certificate with one or more changes to the one or more properties of the one or more certificate characteristics.

11. The one or more non-transitory computer-readable storage media of claim 10, wherein the renewal time is a randomly determined time prior to expiration of the certificate.

12. The one or more non-transitory computer-readable storage media of claim 10, wherein the changing of the one or more properties comprises changing the one or more properties to one or more randomly selected properties in the certificate renewal request.

13. The one or more non-transitory computer-readable storage media of claim 10, wherein the receiving, by the certificate renewal service, the indication to request the renewal of the certificate in the test mode comprises:

receiving, by the certificate renewal service, from the customer, the indication, wherein the indication is a customer request to opt-in to the test mode.

14. The one or more non-transitory computer-readable storage media of claim 10, wherein the certificate renewal service allows the customer to select a property to which a certificate characteristic is permitted, or is not permitted, to be changed when requesting the renewal renewing of the certificates in the test mode.

15. The one or more non-transitory computer-readable storage media of claim 10, wherein the certificate renewal service allows the customer to select a quantity of certificate characteristics for which properties are changed when requesting the renewal renewing of the certificates in the test mode.

* * * * *